US 6,543,473 B2

(12) United States Patent
Miyazaki (10) Patent No.: US 6,543,473 B2
(45) Date of Patent: Apr. 8, 2003

(54) DAMPER VALVE AND A HYDRAULIC POWER STEERING DEVICE USING THE SAME

(75) Inventor: Osamu Miyazaki, Kashihara (JP)

(73) Assignee: Koyo Seiko Co., Ltd., Osaka (JP)

( * ) Notice: Subject to any disclaimer, the term of this patent is extended or adjusted under 35 U.S.C. 154(b) by 50 days.

(21) Appl. No.: 09/939,775

(22) Filed: Aug. 28, 2001

(65) Prior Publication Data

US 2002/0023679 A1 Feb. 28, 2002

(30) Foreign Application Priority Data

Aug. 30, 2000 (JP) ........................................ 2000-261195

(51) Int. Cl.[7] .............................................. F16K 17/18
(52) U.S. Cl. ..................... 137/493; 60/469; 137/493.8; 137/508; 137/565.15
(58) Field of Search ............................... 137/493, 493.8, 137/493.9, 508, 565.15; 60/469

(56) References Cited

U.S. PATENT DOCUMENTS 4,673,051 A * 6/1987 Darling et al. ............ 137/493.3
4,962,817 A * 10/1990 Jones et al. ...................... 175/5
4,969,697 A * 11/1990 Lindenman ............... 137/493.3
5,007,454 A * 4/1991 Lee, II ........................ 137/508
6,003,427 A * 12/1999 Asbrand et al. .............. 91/447
6,164,320 A   12/2000 Hamano et al. .......... 137/493.2

FOREIGN PATENT DOCUMENTS

EP    1006291 A2   6/2000
JP    10-342527    6/2000

* cited by examiner

Primary Examiner—Stephen M. Hepperle
(74) Attorney, Agent, or Firm—Smith, Gambrell & Russell, LLP (57) ABSTRACT

A casing accommodates therein a movable valve adapted to be moved away from a valve seat by a hydraulic oil flowing through an oil-hydraulic circuit from a hydraulic cylinder to an oil-hydraulic pump. In an event of oscillatory hydraulic pressures in the hydraulic cylinder, the hydraulic oil is returned through the oil-hydraulic circuit from the hydraulic cylinder to the oil-hydraulic pump via a second port, a communication path, a minor gap between the movable valve and the valve seat, and a first port. In this process, the communication path allows for a smooth flow of the hydraulic oil from the second port into the movable valve.

4 Claims, 10 Drawing Sheets

Prior art

FIG. 10

Prior art

DAMPER VALVE AND A HYDRAULIC POWER STEERING DEVICE USING THE SAME

BACKGROUND OF THE INVENTION

The present invention relates to a damper valve mounted in vehicles such as motor vehicles and assembled to an oil-hydraulic circuit at place between an oil-hydraulic pump and a hydraulic actuator, as well as to a hydraulic power steering device using the same.

Hydraulic power steering devices for hydraulically assisting steering force have been widely used as a steering device for use in vehicles. The hydraulic power steering device is adapted to output a steering assist force by supplying a hydraulic actuator, such as a hydraulic cylinder, oil-hydraulic motor and the like, with a hydraulic oil outputted from an oil-hydraulic pump. Interposed between the oil-hydraulic pump and the hydraulic actuator is an oil-pressure control valve for controlling oil supply to the hydraulic actuator according to a steering direction and a steering resistance.

The hydraulic power steering device of this type may encounter a so-called shimmy phenomenon, in which vehicle wheels suffer excessive vibrations during normal drive due to poor precisions of parts of a steering system and such vibrations are transmitted to a steering wheel via, for example, a piston rod (rack shaft) of the hydraulic cylinder. In the general practice in the art, an arrangement for suppressing the shimmy phenomenon is made such that, for example, a check valve is disposed in the oil-pressure control valve for sealing the hydraulic cylinder, thereby allowing the hydraulic cylinder to act as a damper against the aforesaid vibrations.

However, the hydraulic cylinder acting as the damper involves the following problem. In a particular case where a driver abruptly turns the steering wheel to avoid danger, the hydraulic oil flowing back from either of the oil chambers to the oil-pressure control valve is blocked by the check valve so that the steering assist force is decreased. As a result, the driver manipulating the steering wheel encounters an abnormal load increase.

In an approach to overcome this problem, a damper valve is interposed in each oil-hydraulic circuit individually interconnecting either one of the laterally arranged oil chambers of the hydraulic cylinder and the oil-pressure control valve.

Figure 8:
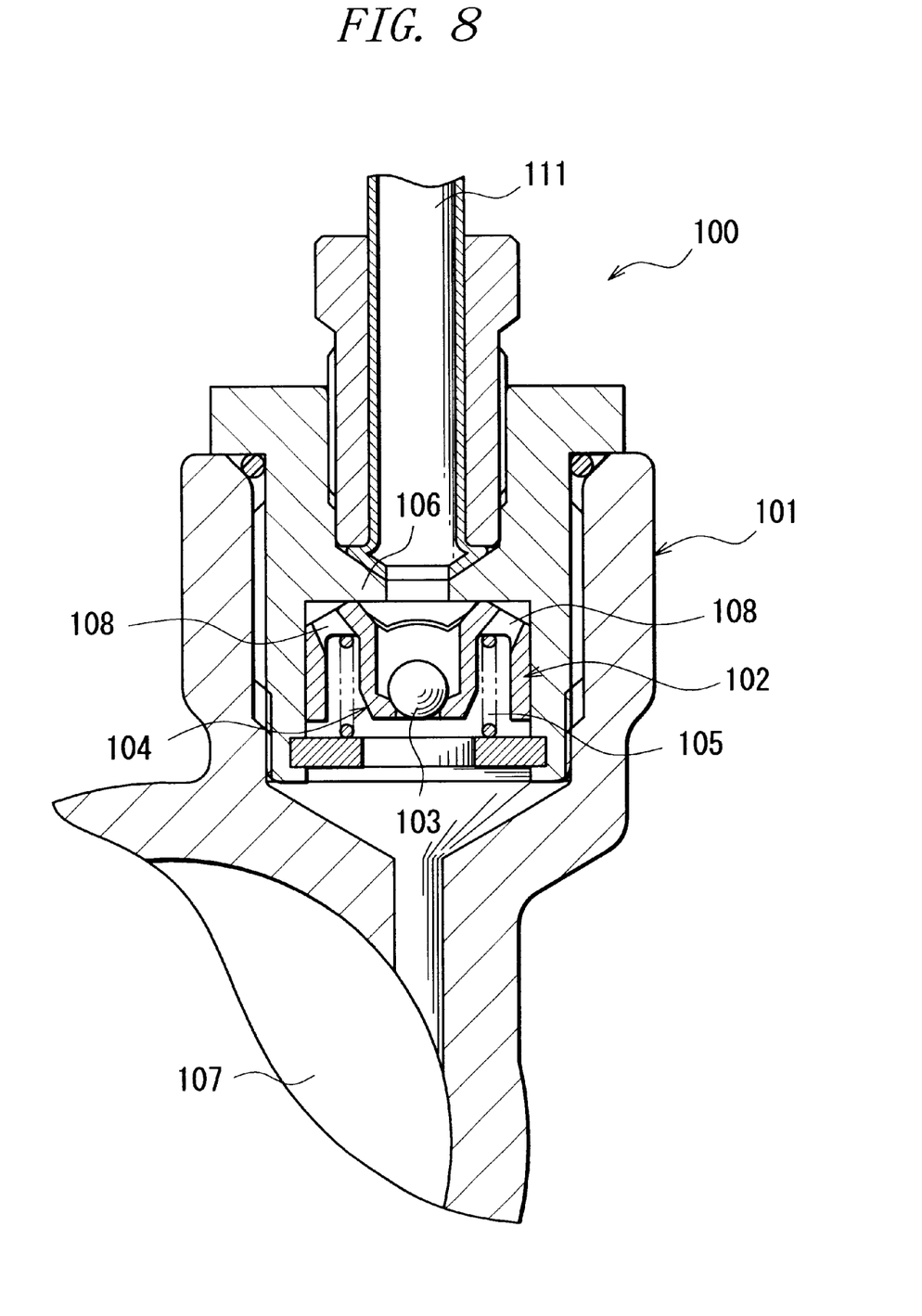
FIG. 8 is a sectional view showing a conventional example of the damper valve.

The damper valve is configured as shown in FIG. 8, for example. A movable valve 102 is accommodated in a hollow casing 101 as allowed to move along an oil passage therethrough. A check valve 104 including a ball 103 is formed within the movable valve 102, which is urged upwardly by a spring 105, as seen in the figure, so that an upper surface of the movable valve is in intimate contact with a throttle shoulder 106 of the casing 101. The movable valve 102 is formed with a plurality of communication holes 108 permitting the hydraulic oil to flow from a hydraulic cylinder (not shown) to an oil-pressure control valve 107 while the movable valve 102 is moved away from the throttle shoulder 106 against the urging force of the spring 105.

Figure 9:
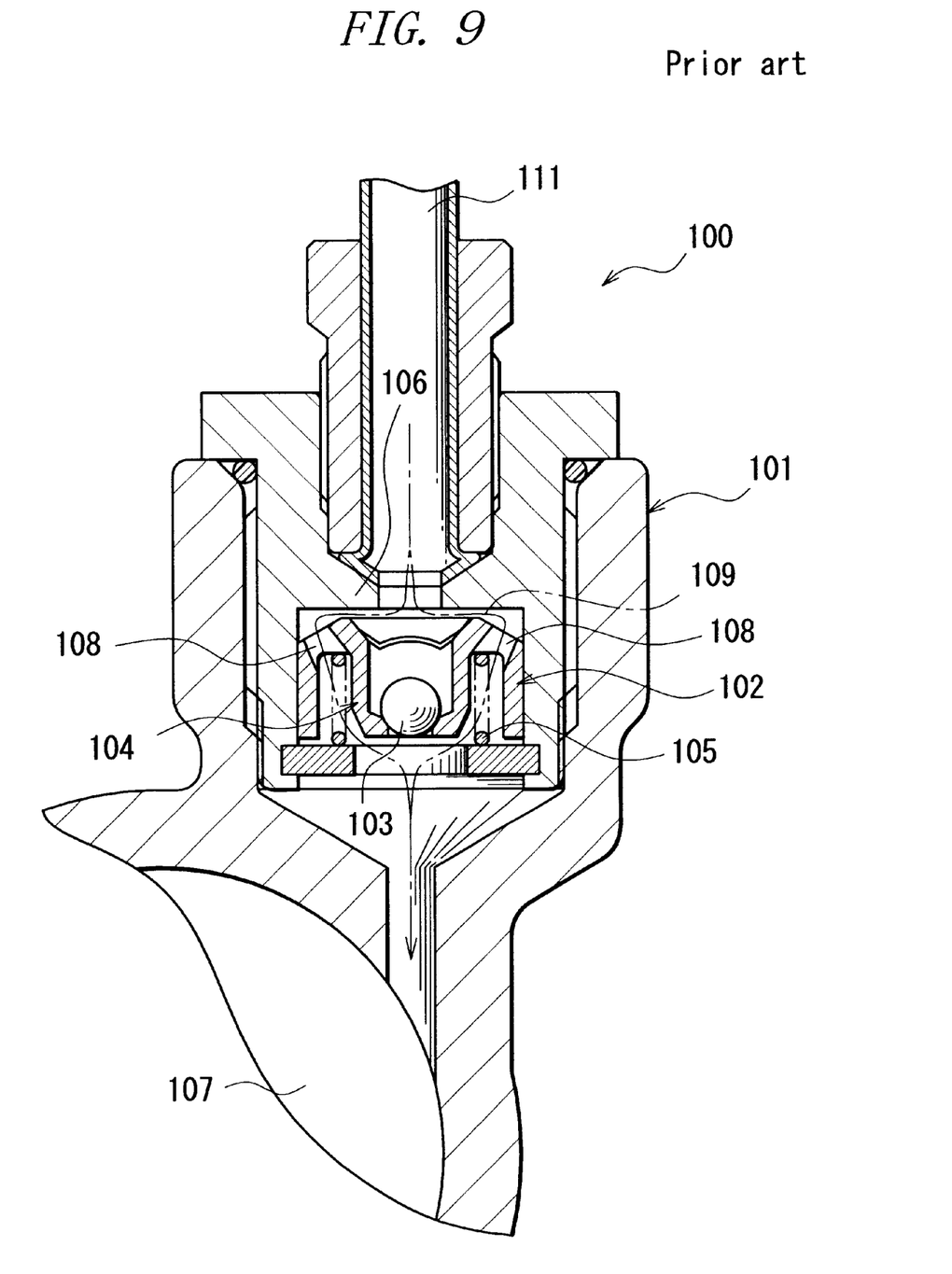
FIG. 9 is a sectional view illustrating an operation of the damper valve of FIG. 8.

According to the damper valve 100, when the vibrations of vehicle wheels causes lateral vibrations of a piston rod of the hydraulic cylinder so that a fractional amount of hydraulic oil, based on the amplitudes of such lateral vibrations, is to be returned from the hydraulic cylinder to the oil-pressure control valve 107, an internal oil passage of the check valve 104 is closed by the ball 103 while the movable valve 102 is moved slightly away from the throttle shoulder 106 against the urging force of the spring 105. This permits the hydraulic oil to be returned to the oil-pressure control valve 107 through a minor gap 109 between the upper surface of the check valve 104 and the throttle shoulder 106 and through the communication holes 108 (see FIG. 9). In this process, the hydraulic oil is throttled down by the minor gap 109, thus producing a damper effect for suppressing the vibration transmission from the vehicle wheels to the steering wheel via the piston rod of the hydraulic cylinder.

Figure 10:
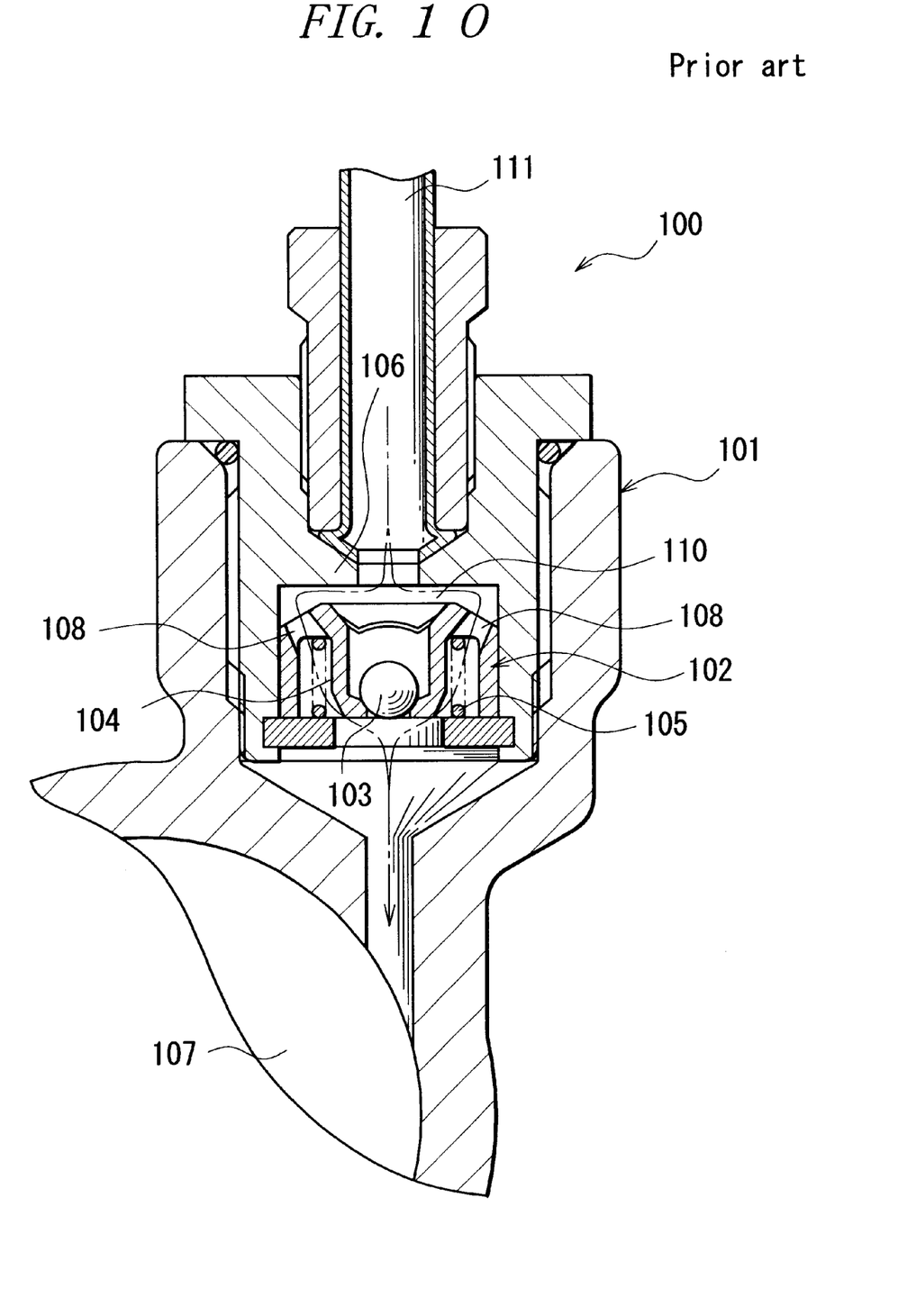
FIG. 10 is a sectional view illustrating another operation of the damper valve of FIG. 8.

In a case where the driver makes an abrupt steering, the hydraulic oil returned from either of the oil chambers of the hydraulic cylinder to the oil-pressure control valve 107 is increased in pressure to above a predetermined level so that the movable valve 102 is moved a great distance away from the throttle shoulder 106 against the urging force of the spring 105. This permits the hydraulic oil to be returned to the oil-pressure control valve 107 (see FIG. 10) via a major gap 110 between the upper surface of the check valve 104 and the throttle shoulder 106, and the communication holes 108. Hence, the occurrence of trouble, such as abnormal load increase of the steering wheel, may be prevented.

In the conventional hydraulic power steering device described above, the hydraulic oil is returned from the hydraulic cylinder to the oil-pressure control valve 107 via the minor gap 109 as follows. The hydraulic oil flowing down through a pipe 111 is deflected in lateral directions to be guided into the minor gap 109. Furthermore, the hydraulic oil flow is sharply deflected downward to be guided from the minor gap 109 into the communication holes 108. Accordingly, the flow resistance in the passage is increased to hinder a smooth flow of the hydraulic oil. Particularly when the vehicle wheels vibrate at abnormally high frequencies thereby causing oscillatory hydraulic pressures (fine, rapid pressure variations) in the hydraulic cylinder, the damper valve is decreased in response to the oscillatory hydraulic pressures to become incapable of effectively presenting the damper effect.

OBJECT OF THE INVENTION

It is an object of the invention to provide a damper valve capable of effectively presenting the damper effect despite the oscillatory hydraulic pressures in the hydraulic actuator, and a hydraulic power steering device using the same.

SUMMARY OF THE INVENTION

The invention is directed to a damper valve disposed on an oil-hydraulic circuit extended between an oil-hydraulic pump and a hydraulic actuator operated by a hydraulic oil supplied by the oil-hydraulic pump, the damper valve comprising: a hollow casing having a first port connected to the oil-hydraulic circuit at place on an oil-hydraulic-pump side, and a second port connected to the oil-hydraulic circuit at place on a hydraulic-actuator side; a cylindrical movable valve disposed in the casing as allowed to move along an oil passage therethrough; a valve sleeve disposed in the casing and having a valve seat allowing the movable valve to be seated on one end surface thereof; a spring for urging the movable valve thereby bringing one end surface of the movable valve into intimate contact with the valve seat of the valve sleeve; a check valve disposed in the valve sleeve and operative to permit the hydraulic oil delivered by the oil-hydraulic pump to flow from the first port through the movable valve and the valve sleeve to the second port but to restrict the reversed flow of the hydraulic oil; and a communication path formed in the valve sleeve and opening into the valve seat for the movable valve at one end thereof thereby allowing for a smooth flow of the hydraulic oil from the second port into the movable valve moved away from the valve seat.

According to the damper valve of this configuration, the hydraulic oil through the oil-hydraulic circuit from the oil-hydraulic-pump side toward the hydraulic actuator is allowed by the check valve to flow from the first port through the movable valve and the valve sleeve to the second port so as to be supplied to the hydraulic actuator.

On the other hand, the hydraulic oil through the oil-hydraulic circuit from the hydraulic actuator toward the oil-hydraulic-pump side is prohibited by the check valve from flowing through the valve sleeve. Instead, the hydraulic oil is guided through the communication path to the valve seat of the valve sleeve so as to push the movable valve away from the valve seat. As a result, the hydraulic oil is returned through the oil-hydraulic circuit from the hydraulic-actuator side to the oil-hydraulic-pump side via the second port, communication path, the gap between the one end surface of the movable valve and the valve seat, and the first port. In this process, the communication path allows for a smooth flow of the hydraulic oil from the second port into the movable valve, thereby ensuring a preferable response to the oscillatory hydraulic pressures in the hydraulic actuator. Thus is accomplished a positive and effective reduction of the influences of disturbances attributable to low precisions of the vehicle components and driving environment, the disturbances including, for example, shimmy phenomenon, kickback phenomenon and the like.

The check valve may be of a unit assembled from a case fixed in the valve sleeve, a movable valve body accommodated in the case, and a valve seat member mounted in the case for allowing the movable valve body to be seated thereon. In this case, the check valve may be readily assembled in the valve sleeve.

The check valve may include a ball for closing an interior of the valve sleeve, and a lock plate serving to retain the ball within the valve sleeve and having a through hole allowing the hydraulic oil to flow therethrough. In this case, the check valve consists of a smaller number of components, contributing to a more simplified construction of the damper valve.

The invention is directed to a hydraulic power steering device comprising: an oil-hydraulic pump; a hydraulic actuator operated by a hydraulic oil supplied by the oil-hydraulic pump thereby outputting a steering assist force; an oil-pressure control valve disposed on an oil-hydraulic circuit at place between the hydraulic actuator and the oil-hydraulic pump and operative to control the supply/discharge of the hydraulic oil to/from the hydraulic actuator according to a steering operation; and the damper valve claimed in any one of claims 1 to 3 and disposed on the oil-hydraulic circuit at place between an output port of the oil-pressure control valve and the hydraulic actuator.

According to the hydraulic power steering device of this configuration, the hydraulic oil from the oil-pressure control valve toward the hydraulic actuator is allowed by the check valve to flow from the first port through the movable valve and the valve sleeve to the second port so as to be supplied to the hydraulic actuator.

On the other hand, the hydraulic oil from the hydraulic actuator toward the oil-pressure control valve is prohibited by the check valve from flowing through the valve sleeve. Instead, the hydraulic oil is guided through the communication path to the valve seat of the valve sleeve, thus pushing the movable valve away from the valve seat. As a result, the hydraulic oil is returned from the hydraulic actuator to the oil-pressure control valve via the second port, communication path, the gap between the one end surface of the movable valve and the valve seat, and the first port. In this process, the communication path allows for a smooth flow of the hydraulic oil from the second port into the movable valve. Therefore, even if the vehicle wheels vibrate at abnormally high frequencies to cause the oscillatory hydraulic pressures in the hydraulic actuator, a preferable response to the oscillatory hydraulic pressures is ensured. This provides for a positive and effective reduction of the influences of disturbances attributable to the low precisions of vehicle components and driving environment, the disturbances including, for example, shimmy phenomenon, kickback phenomenon and the like.

DETAILED DESCRIPTION OF THE PREFERRED EMBODIMENT

The invention will hereinbelow be described in detail with reference to the accompanying drawings showing the preferred embodiments hereof.

Figure 1:
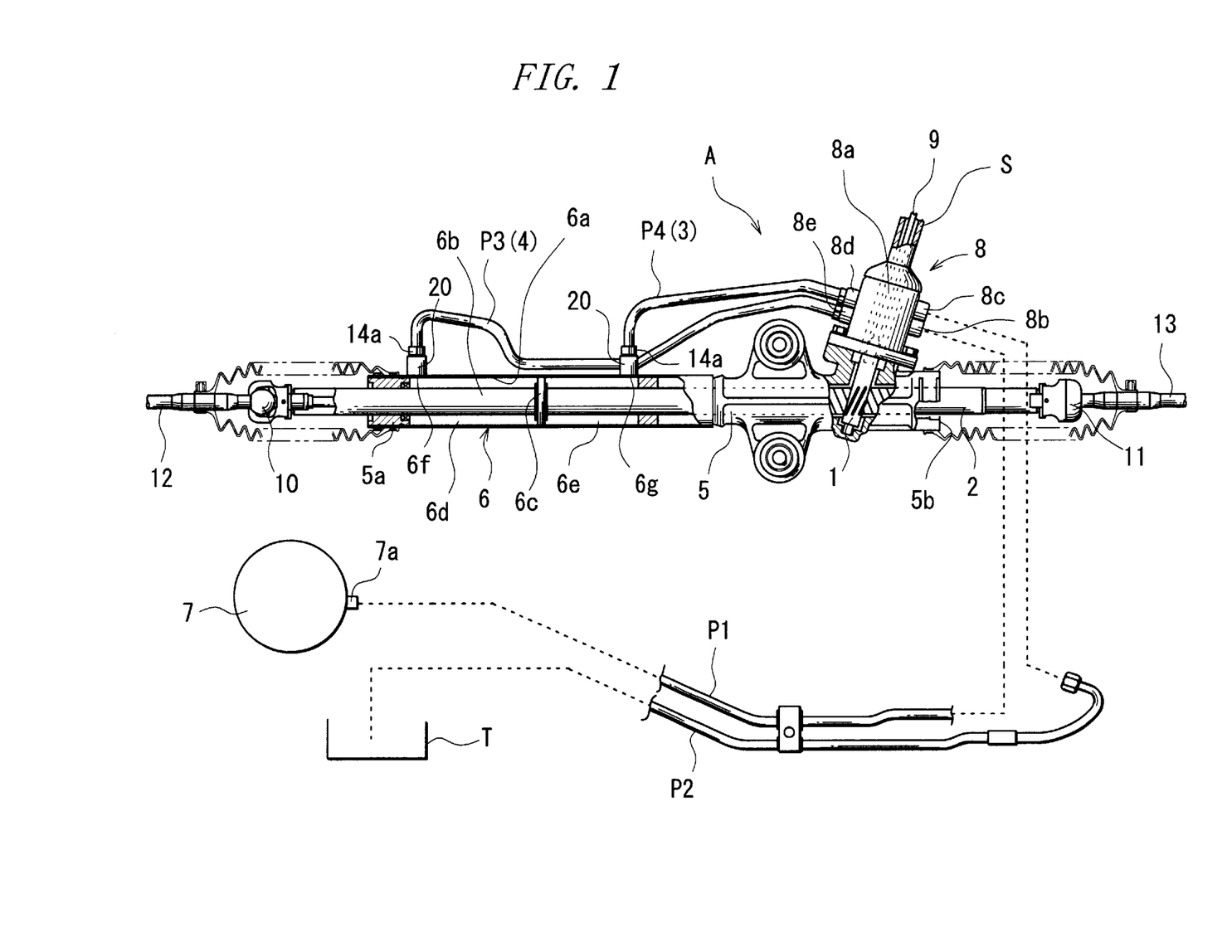
FIG. 1 is a schematic diagram showing a hydraulic power steering device according to one embodiment of the invention.

FIG. 1 is a schematic diagram showing a hydraulic power steering device according to one embodiment of the invention. Referring to the figure, the hydraulic power steering device A essentially includes an input shaft S coupled with an unillustrated steering wheel; a pinion 1 rotated by rotating input shaft S via a torsion bar 9; a rack shaft 2 meshed with the pinion 1; a housing 5 covering the rack shaft 2; a hydraulic cylinder 6 disposed in the housing 5 and operating as a hydraulic actuator; an oil-hydraulic pump 7 for supplying a hydraulic oil to the hydraulic cylinder 6; and an oil-pressure control valve 8 operatively connected with the steering wheel for controlling the supply/discharge of the hydraulic oil to/from the hydraulic cylinder 6.

The rack shaft 2 has opposite ends projected from openings 5a, 5b at opposite ends of the housing 5. The projected ends of the rack shaft 2 are integrated with ball joints 10, 11, respectively. The ball joints 10, 11 are assembled with tie rods 12, 13, respectively. The opposite ends of the rack shaft 2 are connected via the tie rods 12, 13 to vehicle wheels. That is, operative turning of the steering wheel causes the pinion 1 to rotate via the input shaft S, thereby moving the rack shaft 2 in an axial direction (widthwise of the vehicle) for steering the vehicle.

The hydraulic cylinder 6 includes a cylinder tube 6a defined by the housing 5, a piston rod 6b defined by the rack shaft 2, and a piston 6c integrated with the rack shaft 2. A first oil chamber 6d and a second oil chamber 6e are defined by spaces on the opposite sides of the piston 6c.

A rotary valve constitutes the oil-pressure control valve 8, a valve housing 8a of which is formed with an input port 8b, a return port 8c, a first output port 8d and a second output port 8e, these ports projecting from the housing 8a. The input port 8b is connected to an output port 7a of the oil-hydraulic pump 7 via a first oil pipe P1. There turn port 8c is connected to a reservoir T via a second oil pipe P2. The first output port 8d is connected to the first oil chamber 6d of the hydraulic cylinder 6 via a third oil pipe P3, whereas the second output port 8e is connected to the second oil chamber 6e of the hydraulic cylinder 6 via a fourth oil pipe P4. The oil-pressure control valve 8 operates to supply either of the oil chambers 6d, 6e with the hydraulic oil for assistance of the steering force according to a steering direction and a steering resistance while returning the hydraulic oil from the other oil chamber to the reservoir T.

The third oil pipe P3 and the fourth oil pipe P4 are formed from a metal pipe 4, respectively. The oil pipes P3, P4 are each connected to the hydraulic cylinder 6 via a damper valve 20 according to one embodiment of the invention. Specifically, the third oil pipe P3 is connected to a first input port 6f via a connector 14a and the damper valve 20, the first input port 6f communicated with the first oil chamber 6d of the hydraulic cylinder 6. Similarly, the fourth oil pipe P4 is connected to a second input port 6g via the connector 14a and the damper valve 20, the second input port 6g communicated with the second oil chamber 6e of the hydraulic cylinder 6. It is noted that the oil pipes P3, P4 individually constitute a part of the oil-hydraulic circuit on the side of the oil-hydraulic pump 7 with respect to the damper valve 20.

Each damper valve 20 functions as a check valve for permitting the flow of hydraulic oil from the oil-pressure control valve 8 to the hydraulic cylinder 6 and also as a throttle check valve for permitting the reversed flow of the hydraulic oil while exerting a predetermined resistance.

Figure 2:
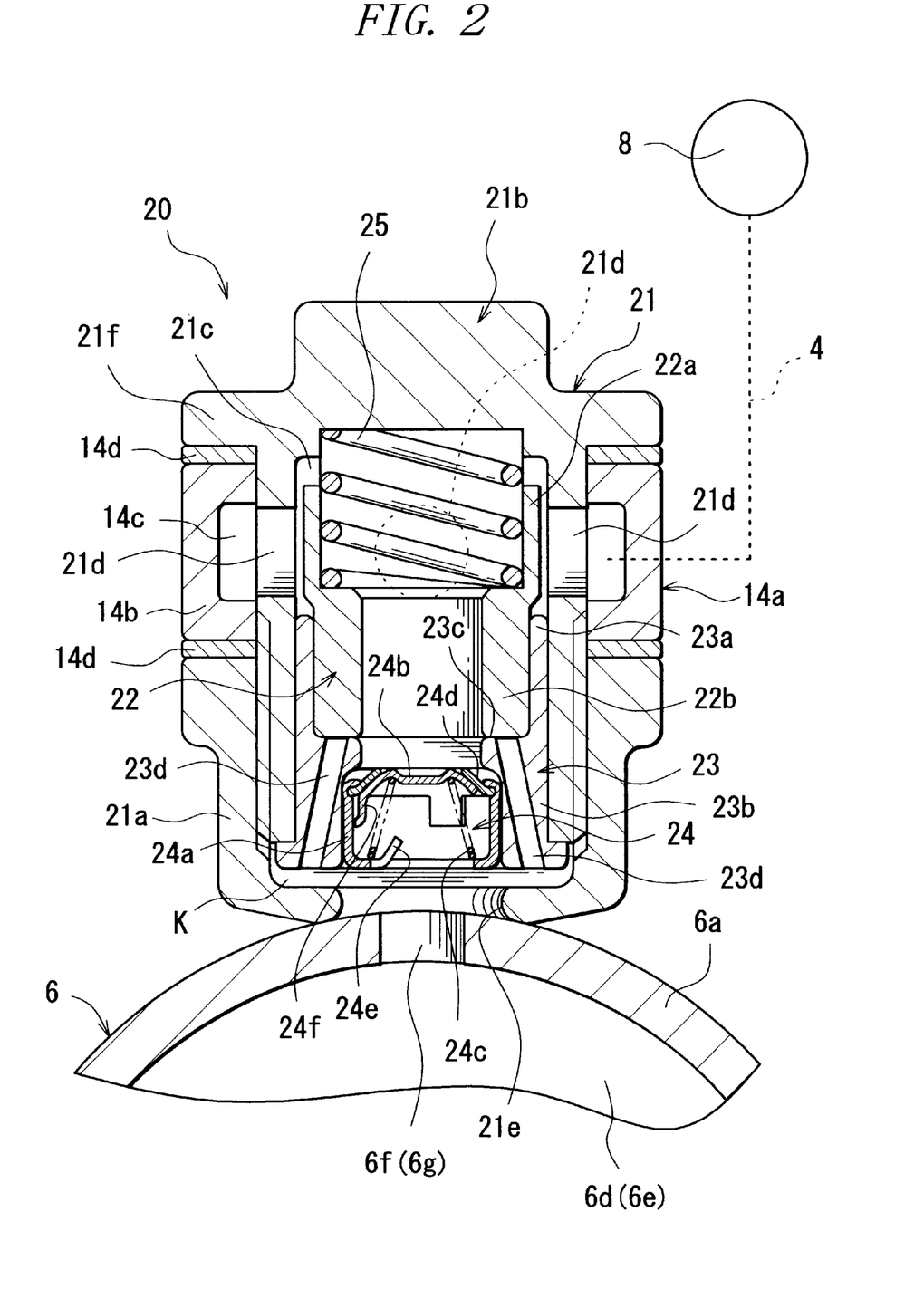
FIG. 2 is a sectional view showing a damper valve according to one embodiment of the invention.

Now referring to FIG. 2, the damper valve 20 includes a hollow casing 21, a cylindrical movable valve 22 disposed in the casing 21, a coil spring 25 for urging the movable valve 22, a valve sleeve 23 for seating the movable valve 22, and a check valve 24 accommodated in the valve sleeve 23. The figure depicts the damper valve 20 wherein an interior of the casing 21 is closed by the movable valve 22, the valve sleeve 23 and the check valve 24.

The casing 21 includes a cup-shaped main body 21a, and a cap 21b with its distal end forced in the main body 21a. The main body 21a and the cap 21b cooperate to define a hollow portion 21c. The main body 21a is formed with a second port 21e in its bottom for communicating the hollow portion 21c with the first oil chamber 6d (or the second oil chamber 6e) of the hydraulic cylinder 6. The second port 21e has its periphery welded to the cylinder tube 6a of the hydraulic cylinder 6. On the other hand, an upper half portion of the cap 21b is connected with the connector 14a, and is formed with a first port 21d for communicating the hollow portion 21c with the oil-pressure control valve 8 via the connector 14a and the metal pipe 4.

The connector 14a includes an annular portion 14b surrounding the upper half portion of the cap 21b and an oil passage 14c formed along an inner periphery of the annular portion 14b. The first ports 21d are disposed at, for example, four places equally spaced and in corresponding relation with the oil passage 14c. The connector 14a is sandwiched between an upper end face of the main body 21a and a flange 21f of the cap 21b via an annular packing 14d.

The movable valve 22 is movable along an oil passage in the hollow portion 21c of the casing 21 (vertical direction as seen in the figure). The movable valve 22 includes a thin-walled cylinder portion 22a on an upper side thereof and a thick-walled cylinder portion 22b on a lower side thereof. The movable valve 22 receives the spring 25 in the thin-walled cylinder portion 22a thereof.

The valve sleeve 23 includes a thin-walled cylinder portion 23a on an upper side thereof and a thick-walled cylinder portion 23b on a lower side thereof. The thin-walled cylinder portion 23a slidably receives the thick-walled cylinder portion 22b of the movable valve 22, thereby guiding the movement of the movable valve 22. A step on an inner side of the thick-walled cylinder portion 23b defines a valve seat 23c, with which a bottom end surface of the movable valve 22 is in intimate contact. A predetermined gap K is provided between a bottom surface of the valve sleeve 23 and an inside bottom surface of the casing 21.

The thick-walled cylinder portion 23b of the valve sleeve 23 is formed with a communication path 23d opening into the valve seat 23c at one end thereof and into the gap K at the other end thereof. A plural number of communication paths 23d are circumferentially arranged with equal spacing. The communication paths have their upper ends open into the valve seat 23c and located in the closest possible vicinity with an inner periphery of the movable valve 22.

The check valve 24 includes a cylindrical case 24a accommodated in the valve sleeve 23, a movable valve body 24b disposed in the case 24a, a coil spring 24c accommodated in the case 24a for urging the movable valve body 24b, and a ring-like valve seat member 24d mounted in the case 24a for seating the movable valve body 24b. The check valve 24 is of a unit assembled from these components, and is press-inserted into an inner periphery of the valve sleeve 23 to be fixed therein. The adoption of the unitized check valve 24 facilitates the assembly of the check valve 24 in the valve sleeve 23.

The case 24a is formed with a projection 24e at a lower end thereof, the projection 24e being bent inwardly for retaining the coil spring 24c. The valve seat member 24d is attached to an upper aperture of the case 24a by crimping, for example.

The movable valve body 24b is allowed to move along the oil passage but is normally held in intimate contact with the valve seat member 24d by an urging force of the coil spring 24c thereby closing an opening formed at the center of the valve seat member 24d. Thus, the check valve 24 maintains an interior of the movable valve 22 in a closed state, thereby blocking the flow of the hydraulic oil to be returned from the hydraulic cylinder 6 to the oil-pressure control valve 8. The movable valve body 24b is formed with a plurality of engagement portions 24f at places on its periphery, the engagement portions 24f engaging an inner periphery of the case 24a for maintaining the position of the movable valve body 24b.

Figure 3:
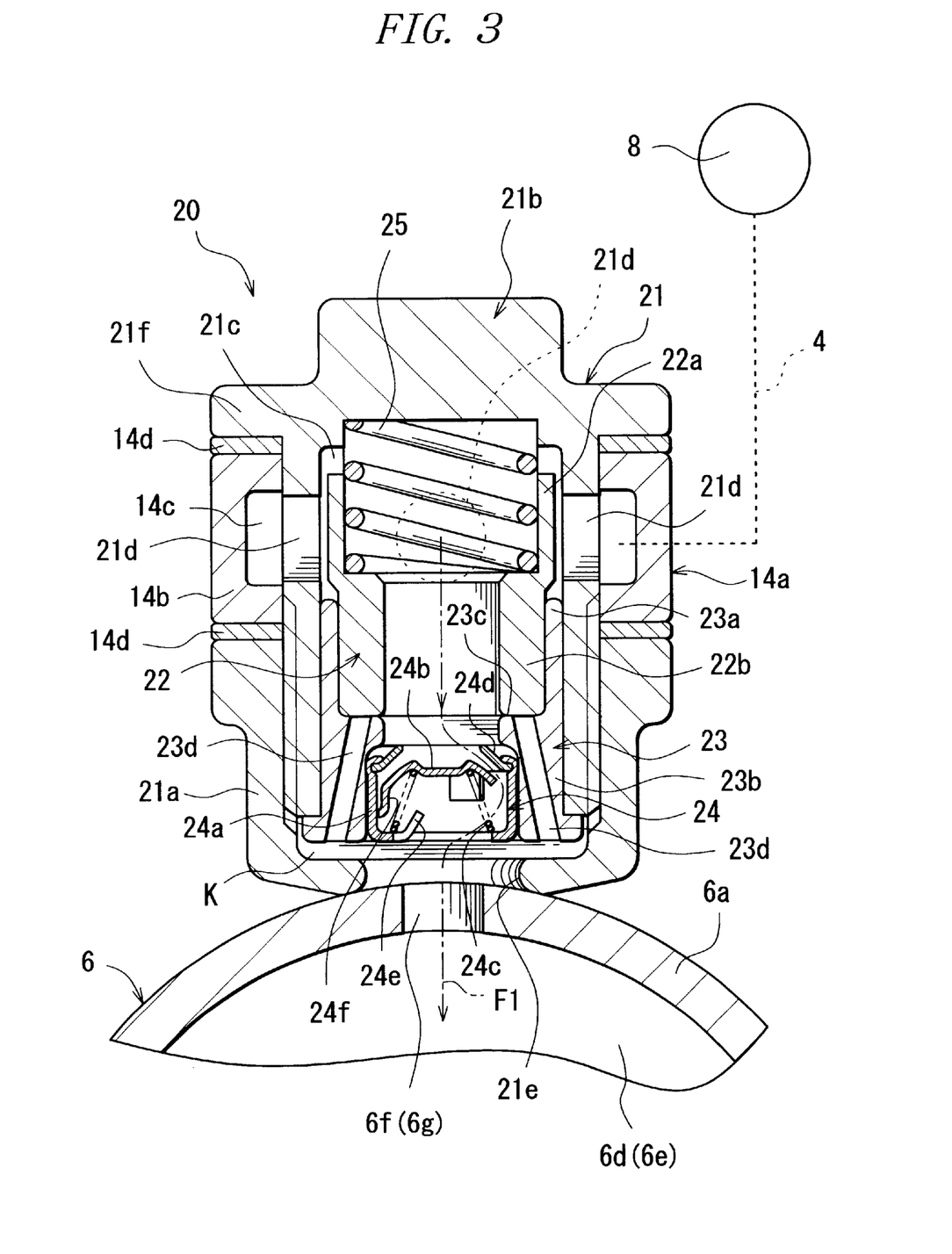
FIG. 3 is a sectional view illustrating an operation of a check valve shown in FIG. 2.

In the check valve 24, as shown in FIG. 3, the movable valve body 24b is pushed against the urging force of the coil spring 24c by the pressure of the hydraulic oil flowing from the oil-pressure control valve 8 to the hydraulic cylinder 6, thus moved away from the valve seat member 24d toward a lower end of the casing 21. This opens the interior of the valve sleeve 23 so that the hydraulic oil flows through the first port 21d of the casing 21, the interior of the movable valve 22, the interior of the valve sleeve 23, and the second port 21e of the casing 21, as indicated by an arrow F1 in the figure. As a result, the hydraulic oil from the oil-pressure control valve 8 is supplied to either one of the oil chambers that corresponds to a steered direction of the steering wheel, thereby providing assist for the rotative operation of the steering wheel.

The spring 25 urges the movable valve 22 toward the second port 21e at a predetermined pressure thereby maintaining a lower end surface of the movable valve 22 in intimate contact with the valve seat 23c of the valve sleeve 23. As resiliently contracted, the spring 25 is interposed between an upper end surface of the thick-walled cylinder portion 22b of the movable valve 22 and a ceiling of the cap 21b so that the spring 25 may be expanded or contracted in accordance with the pressure of the hydraulic oil to be returned from the hydraulic cylinder 6 to the oil-pressure control valve 8. The urging force of the spring 25 is set to such a value that the movable valve 22 is allowed to move slightly away from the valve seat 23c to produce a minor gap S1 (see FIG. 4) therebetween when the piston rod 6b of the hydraulic cylinder 6 is caused to vibrate by the vibrations of the vehicle wheels.

Figure 4:
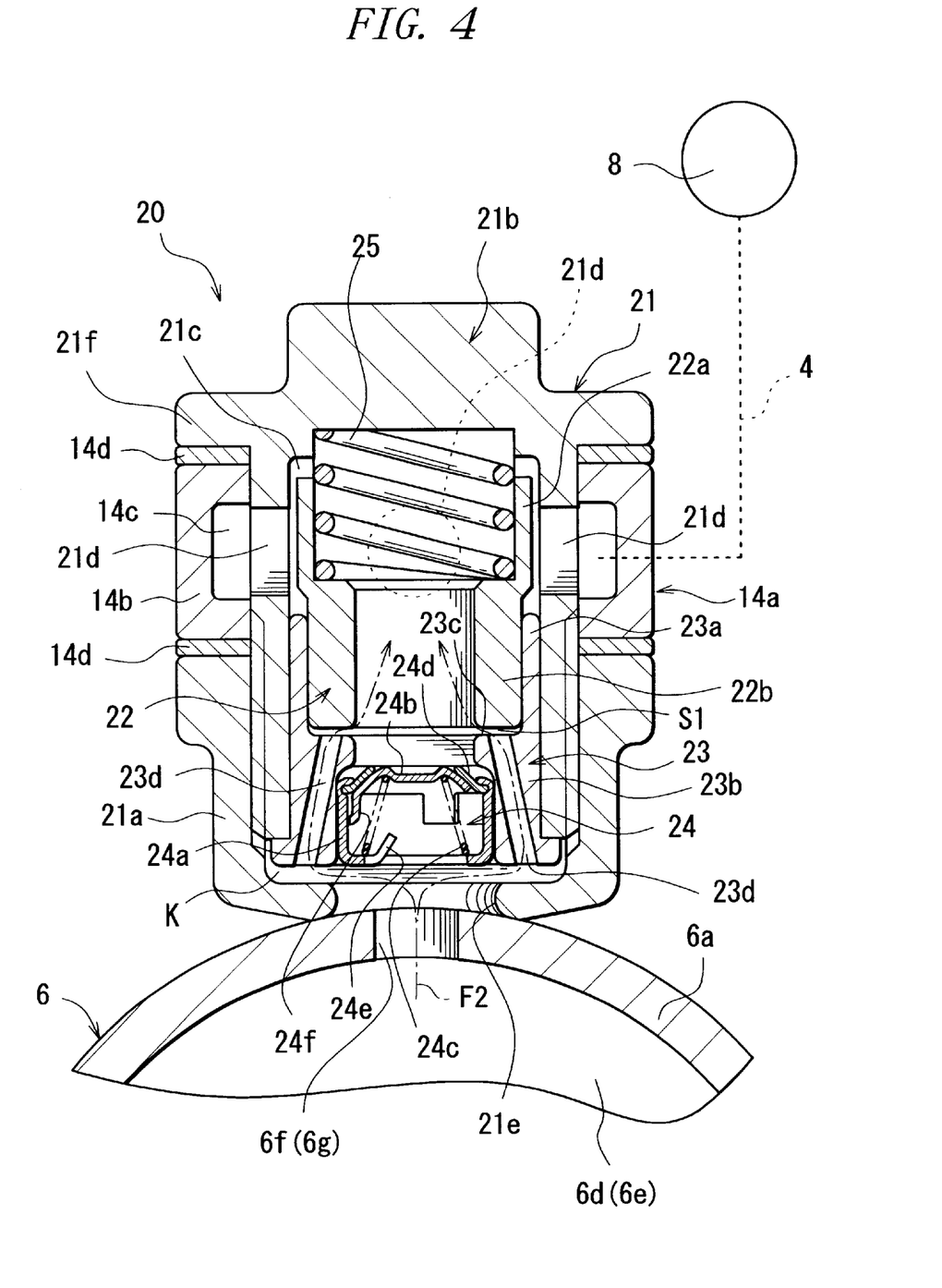
FIG. 4 is a sectional view illustrating an operation of the damper valve shown in FIG. 2.

In the damper valve 20 of the above configuration, when the piston rod 6b of the hydraulic cylinder 6 is caused to vibrate laterally by the vibrations of the vehicle wheels, the hydraulic oil from the hydraulic cylinder 6 is returned to the oil-pressure control valve 8 via the second port 21e of the casing 21, the communication paths 23d, the minor gap S1, the interior of the movable valve 22 and the first port 21d, as indicated by an arrow F2 in FIG. 4. In this process, the hydraulic oil is throttled by the minor gap S1 to produce the damper effect for suppressing the vibration transmission from the vehicle wheels to the steering wheel via the piston rod 6b of the hydraulic cylinder 6. Furthermore, since the opening of the communication path 23d at the valve seat 23c is in close vicinity with the inner periphery of the movable valve 22, the hydraulic oil from the hydraulic cylinder 6 is smoothly guided through the second port 21e and communication paths 23d into the movable valve 22 with a low flow resistance in the passage. Hence, even if the vehicle wheels vibrating at abnormally high frequencies causes fine, quick lateral vibrations of the piston rod 6b of the hydraulic cylinder 6 thereby producing oscillatory hydraulic pressure waves in the hydraulic cylinder 6, the minor gap S1 is effective to produce the damper effect. This ensures that the influences of disturbances, such as shimmy phenomenon, attributable to low precisions of the vehicle components and driving environment can be positively and effectively decreased.

Figure 5:
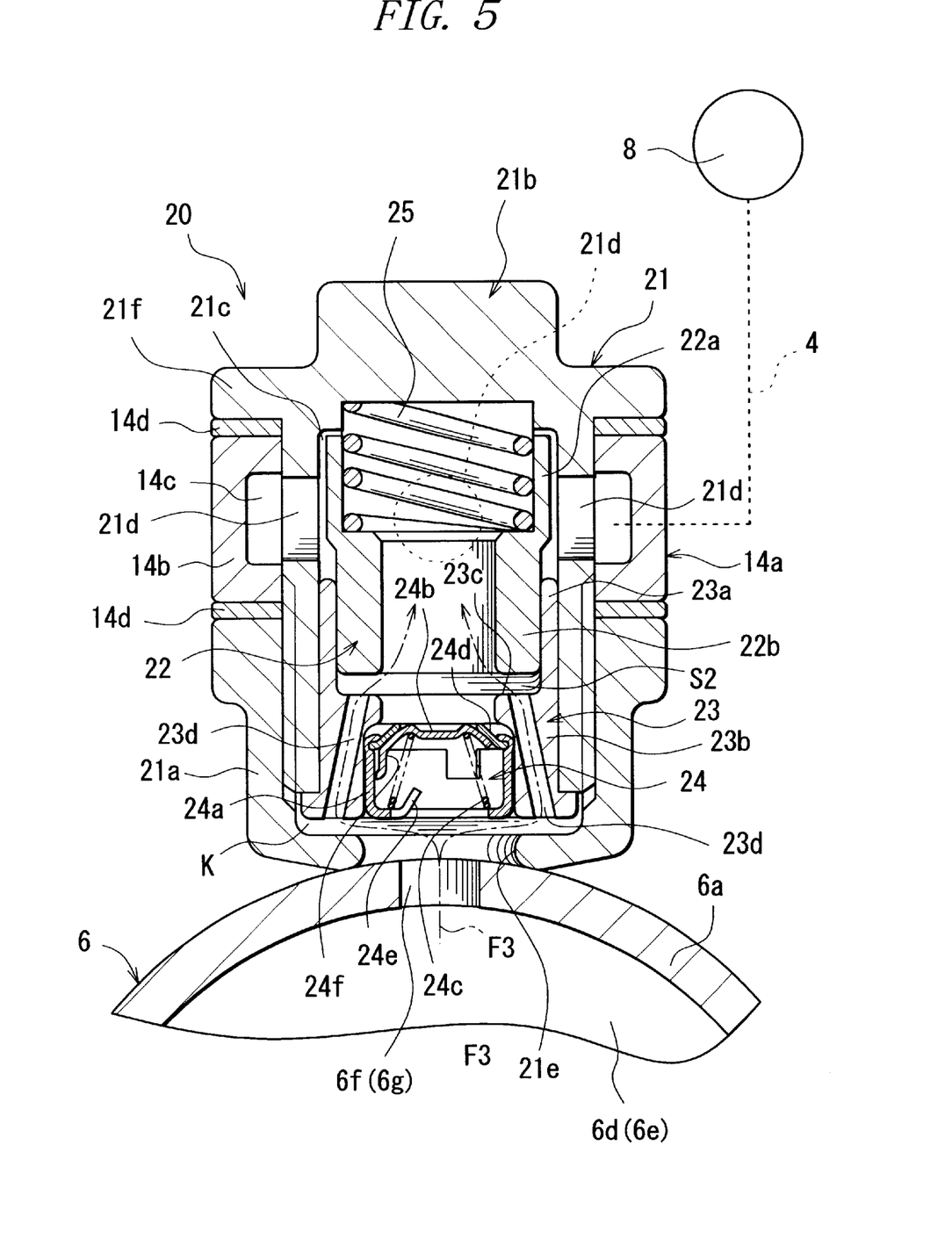
FIG. 5 is a sectional view illustrating another operation of the damper valve shown in FIG. 2.

If, on the other hand, the hydraulic oil returned to the oil-pressure control valve 8 is increased in pressure to above a predetermined level due to the abrupt steering of the steering wheel or the like, the hydraulic oil moves the movable valve 22 a great distance away from the valve seat 23c to produce a major gap S2 therebetween (see FIG. 5). Thus, the hydraulic oil is returned from the hydraulic cylinder 6 to the oil-pressure control valve 8 via the second port 21e of the casing 21, the communication paths 23d, the major gap S2, the interior of the movable valve 22 and the first port 21d, as indicated by an arrow F3 in the figure. As a result, it is ensured that the steering assist force is prevented from decreasing to cause trouble such as an abnormally increased load of the steering wheel or the like.

Figure 6:
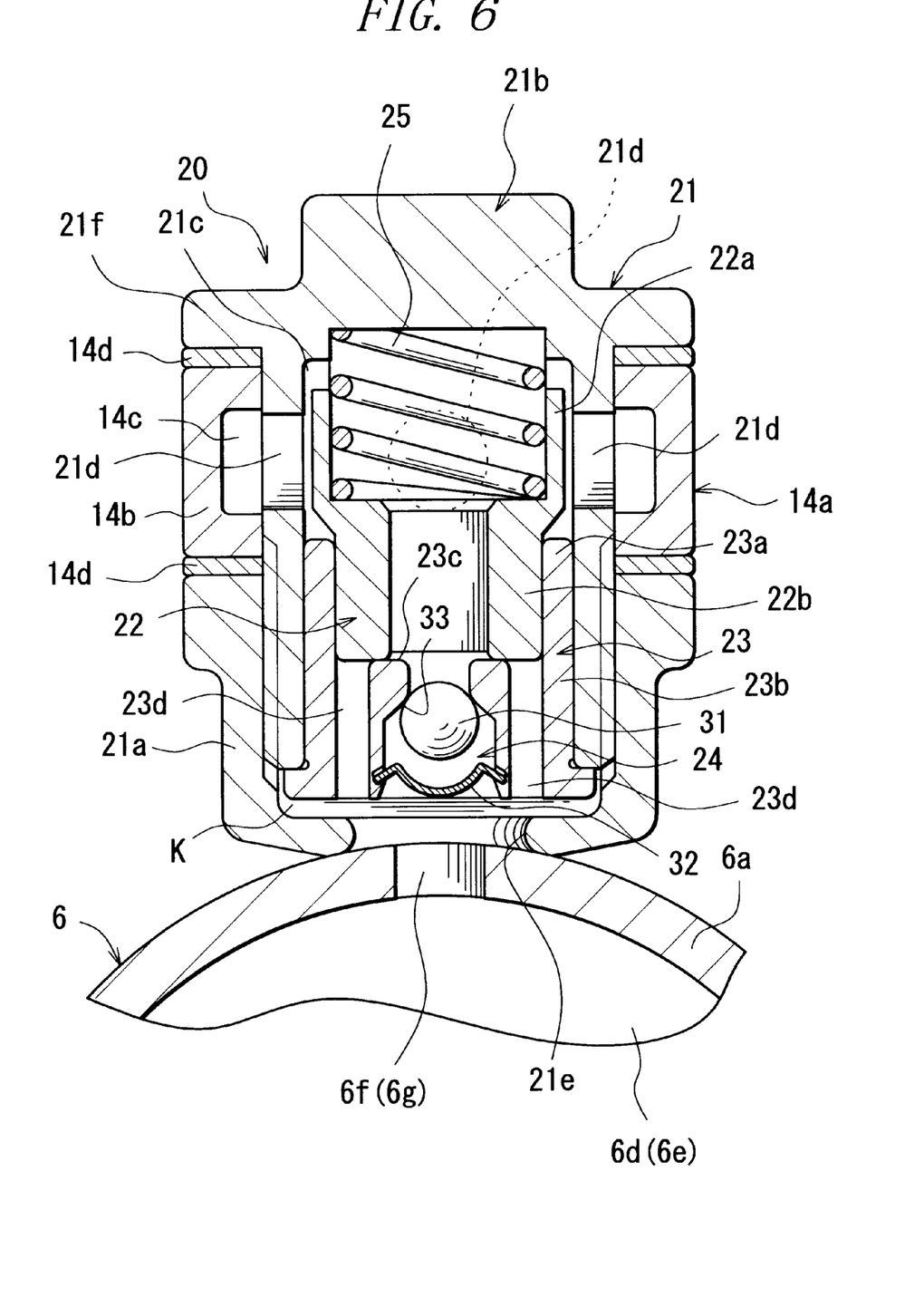
FIG. 6 is a sectional view showing a damper valve according to another embodiment of the invention.

FIG. 6 is a sectional view showing a damper valve 20 according to another embodiment of the invention. This embodiment differs from the foregoing one in that the check valve 24 employs a ball 31.

Specifically, the damper valve 20 includes, as shown in the figure, the ball 31 for closing the interior of the valve sleeve 23, and a lock plate 32 attached to an end of the inner periphery of the valve sleeve 23. The valve sleeve 23 is formed with a valve seat 33 on an inner side of its body, the valve seat adapted to be in intimate contact with the ball 31. In this damper valve 20, the hydraulic oil flowing through the second port 21e of the casing 21 toward the first port 21d thereof pushes the ball 31 into seated position on the valve seat 33, thereby closing the interior of the valve sleeve 23.

Figure 7:
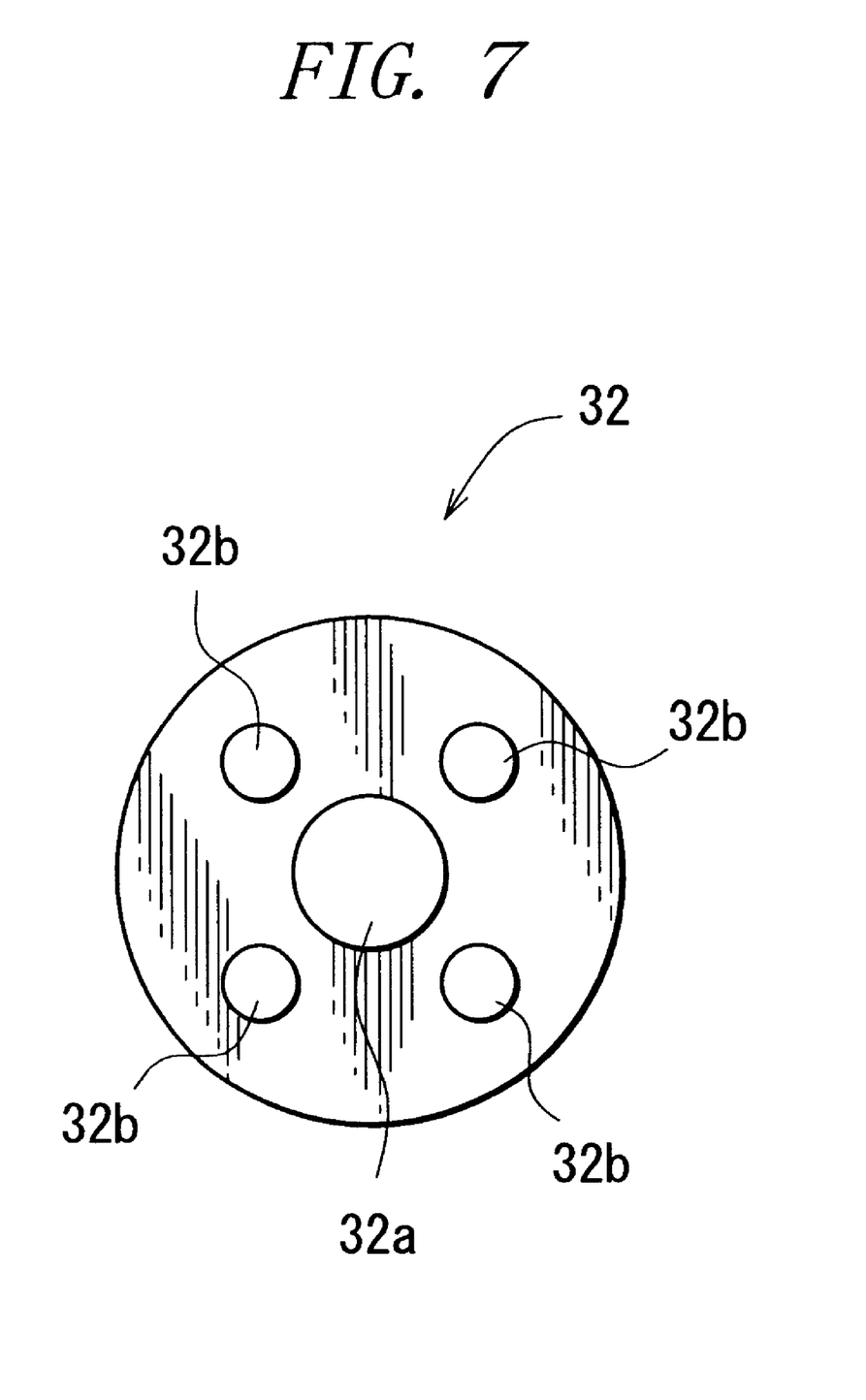
FIG. 7 is a plan view showing a lock plate of the above figure.

The lock plate 32 is formed from a disc including a plurality of through holes 32a, 32b, as shown in FIG. 7. The ball 31 is normally held within the valve sleeve 23 by the lock plate 32. The number and diameter of the through holes 32a, 32b of the lock plate 32 (that is, the total open area of the plate) are selected such that the flow of the hydraulic oil may not be blocked when the ball 31 is pushed into intimate contact with the lock plate 32 by the flow of the hydraulic oil.

This embodiment offers the damper valve 20 of a simplified construction with a reduced number of components because the check valve 24 is constructed using the ball 31 and the lock plate 32.

The foregoing embodiments are described by way of the example wherein the damper valve 20 is attached to the distal end of the third oil pipe P3 and the fourth oil pipe P4, respectively. However, the damper valve 20 may be disposed on the oil-hydraulic circuit at any place between the output port 8d, 8e of the oil-pressure control valve 8 and the hydraulic cylinder 6. For instance, the damper valve 20 may be disposed in the first output port 8d or the second output port 8e of the oil-pressure control valve 8.

What is claimed is:

1. A damper valve disposed on an oil-hydraulic circuit extended between an oil-hydraulic pump and a hydraulic actuator operated by a hydraulic oil supplied by the oil-hydraulic pump, the valve comprising:

a hollow casing having a first port connected to the oil-hydraulic circuit at place on an oil-hydraulic-pump side, and a second port connected to the oil-hydraulic circuit at place on a hydraulic-actuator side;

a cylindrical movable valve disposed in the casing as allowed to move along an oil passage therethrough;

a valve sleeve disposed in the casing and having a valve seat allowing the movable valve to be seated on one end surface thereof;

a spring for urging the movable valve thereby bringing one end surface of the movable valve into intimate contact with the valve seat of the valve sleeve;

a check valve disposed in the valve sleeve and operative to permit the hydraulic oil delivered by the oil-hydraulic pump to flow from the first port through the movable valve and the valve sleeve to the second port but to restrict the reversed flow of the hydraulic oil; and a communication path formed in the valve sleeve and opening into the valve seat for the movable valve at one end thereof thereby allowing for a smooth flow of the hydraulic oil from the second port into the movable valve moved away from the valve seat.

2. A damper valve as claimed in claim 1, wherein the check valve is of a unit assembled from a case fixed in the valve sleeve, a movable valve body accommodated in the case, and a valve seat member mounted in the case for allowing the movable valve body to be seated thereon.

3. A damper valve as claimed in claim 1, wherein the check valve includes a ball for closing an interior of the valve sleeve, and a lock plate serving to retain the ball within the valve sleeve and having a through hole allowing the hydraulic oil to flow therethrough.

4. A hydraulic power steering device comprising:

an oil-hydraulic pump;

a hydraulic actuator operated by a hydraulic oil supplied by the oil-hydraulic pump thereby outputting a steering assist force;

an oil-pressure control valve disposed on an oil-hydraulic circuit at place between the hydraulic actuator and the oil-hydraulic pump and operative to control the supply/discharge of the hydraulic oil to/from the hydraulic actuator according to a steering operation; and the damper valve claimed in any one of claims 1 to 3 and disposed on the oil-hydraulic circuit at place between an output port of the oil-pressure control valve and the hydraulic actuator.

* * * * *